(No Model.)
W. W. ANNABLE.
PULLEY.
No. 413,819. Patented Oct. 29, 1889.
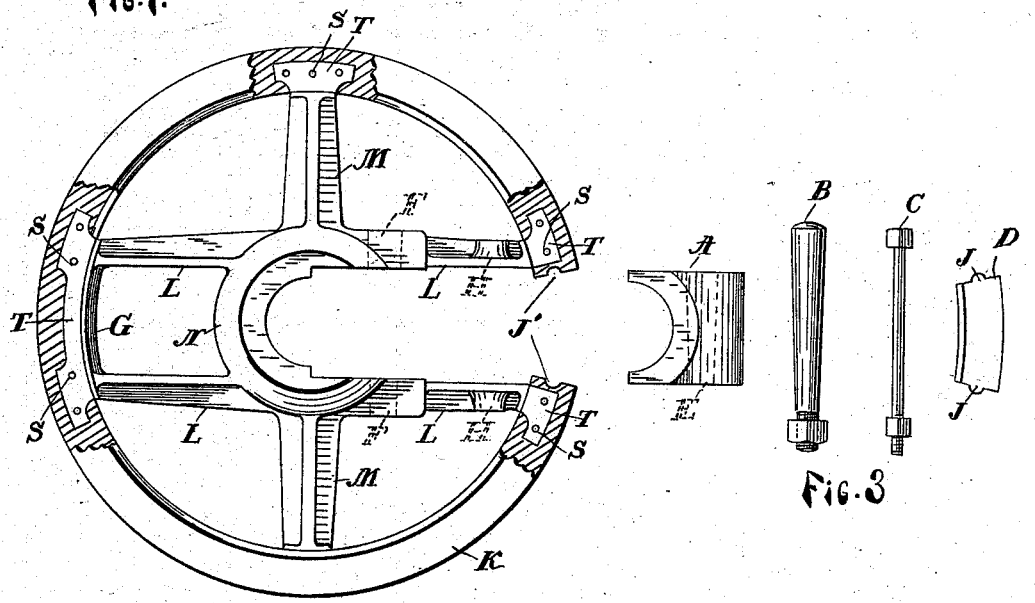
Fig. 1.
Fig. 3.
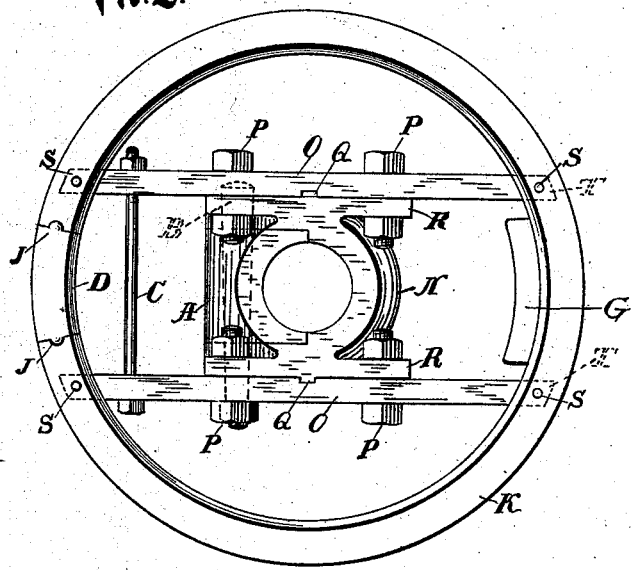
Fig. 2.
Witnesses
Joseph B. Mason
Cora K. Mason
Inventor
Warren W. Annable
By his Attorney
Cyrus E. Perkins

UNITED STATES PATENT OFFICE.

WARREN W. ANNABLE, OF GRAND RAPIDS, MICHIGAN.

PULLEY.

SPECIFICATION forming part of Letters Patent No. 413,819, dated October 29, 1889.

Application filed September 5, 1888. Serial No. 284,675. (No model.)

*To all whom it may concern:*

Be it known that I, WARREN W. ANNABLE, a citizen of the United States, residing at the city of Grand Rapids, in the county of Kent and State of Michigan, have invented certain new and useful Improvements in Pulleys; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a plan view of pulley with sections of rim uncovered, segment removed, and showing how spokes or arms are fastened to the rim. Fig. 2 is a variation of Fig. 1, showing adaptation of device to large pulleys. Fig. 3 shows the separate parts of the segment and the devices for holding same firmly in place.

Similar letters refer to similar parts.

My invention relates to that class of pulleys so constructed as to be readily adjustable on shafting without disturbing other parts of machinery by means of a bisection of the rim and hub.

I describe my invention as follows: The rim K of the pulley is constructed with a removable section or segment D, having lugs J J on both ends fitting in the slots J' J'. The spokes or arms L L and M M of the pulley are integral, and are secured to the rim K by means of the flanges T T T T and rivets S S S S through the flanges into the rim, and said spokes or arms L L have holes H H through same at the ends nearest the divided side of the rim, through which passes the bolt C, whereby the rim K can be so tightened as to hold the segment D securely in place. The hub N of the pulley is also divided, having the removable segment A, with the tapering hole E, (shown in dotted lines,) meeting the holes F F (also shown in dotted lines) in the spokes or arms L L, through which passes the tapering bolt B, having a nut on its smaller end, whereby it can be so tightened as to hold said segment A securely in place.

The spokes or arms L L are constructed with a sufficient weight of iron G to balance the extra weight of parts B, C, and D on the opposite side.

In the variation shown in Fig. 2 the hub N is held securely in place by means of bolts P P P P, through the spokes or arms O O and the flanges R R of the hub, and also by the tenons Q Q in the recesses made therefor.

I am aware that pulleys with removable sections are not novel, and I do not claim the same, broadly; but I do claim—

A pulley having a rim made with a segment D, provided with lugs J' J', the spokes or arms, and a separable hub, one part of which is secured to said spokes or arms by a conical or tapering screw-bolt B, and the rim of said pulley having a balance-weight G opposite the removable segment, all substantially as shown and described.

In testimony whereof I affix my signature in presence of two witnesses.

WARREN W. ANNABLE.

Witnesses:
ADOLPH B. MASON,
ELLA P. SHUSTER.